(12) United States Patent
Williams

(10) Patent No.: US 7,621,431 B2
(45) Date of Patent: Nov. 24, 2009

(54) FOLDING STROLLER TRAY

(75) Inventor: Bruce L. Williams, Denver, PA (US)

(73) Assignee: Chicco USA, Inc., Lancaster, PA (US)

( * ) Notice: Subject to any disclaimer, the term of this patent is extended or adjusted under 35 U.S.C. 154(b) by 784 days.

(21) Appl. No.: 11/100,210

(22) Filed: Apr. 6, 2005

(65) Prior Publication Data

US 2006/0226191 A1 Oct. 12, 2006

(51) Int. Cl.
*B60R 7/00* (2006.01)
*B60R 9/00* (2006.01)

(52) U.S. Cl. .................. 224/409; 224/282; 224/553

(58) Field of Classification Search .......... 224/409, 224/282, 553, 42.46; 108/44; 220/822, 23.83; D12/133
See application file for complete search history.

(56) References Cited

U.S. PATENT DOCUMENTS

| 4,513,974 | A | * | 4/1985 | Lin ........................ 273/239 |
| D357,440 | S | | 4/1995 | Pietra |
| 5,437,493 | A | * | 8/1995 | Weisleder ................ 297/150 |
| 5,441,163 | A | * | 8/1995 | Carrasco ............... 220/23.86 |
| 5,649,737 | A | | 7/1997 | Behnke |
| D470,803 | S | | 2/2003 | Hansen |

* cited by examiner

*Primary Examiner*—Nathan J Newhouse
*Assistant Examiner*—Lester L Vanterpool
(74) *Attorney, Agent, or Firm*—Volpe and Koenig P.C.

(57) ABSTRACT

A folding stroller tray that finds particular use with folding strollers commonly used with small children. The present invention provides a folding stroller tray with a plurality of members which have complementary nested portions that are connected by fasteners that pass the nesting portions to define axis about which the members rotate and join the members to define a desired plane of contact among the assembled members. The present invention includes a method for providing a folding stroller tray.

15 Claims, 6 Drawing Sheets

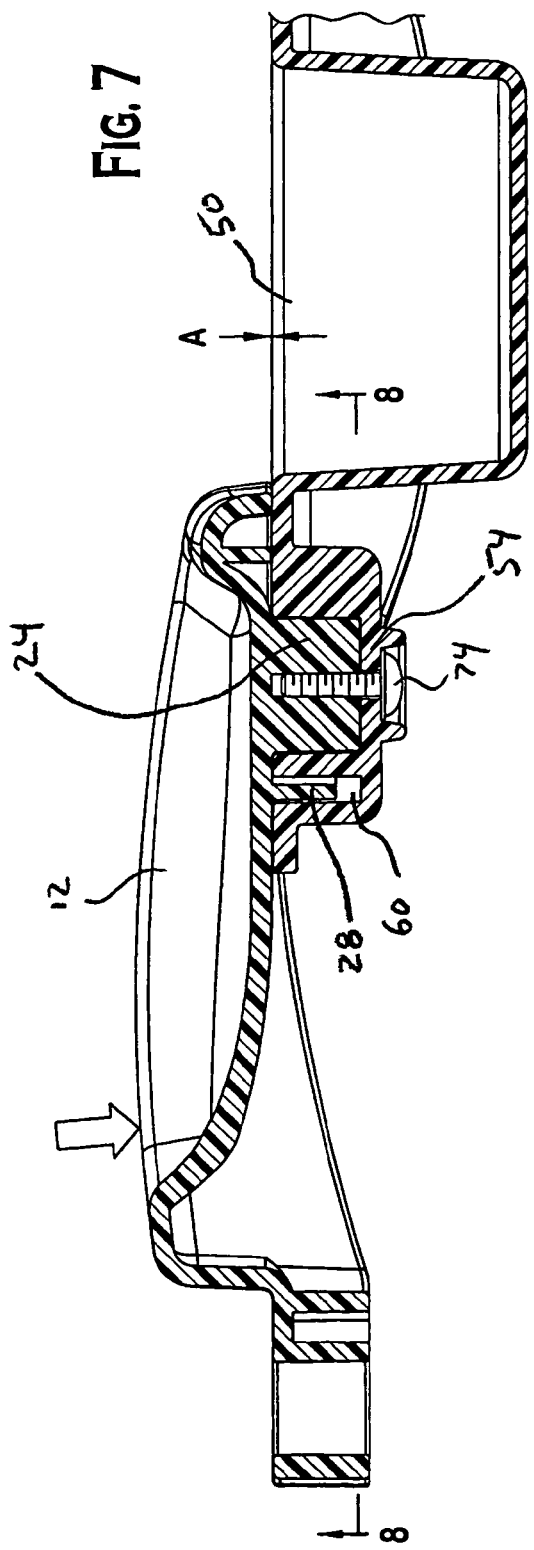
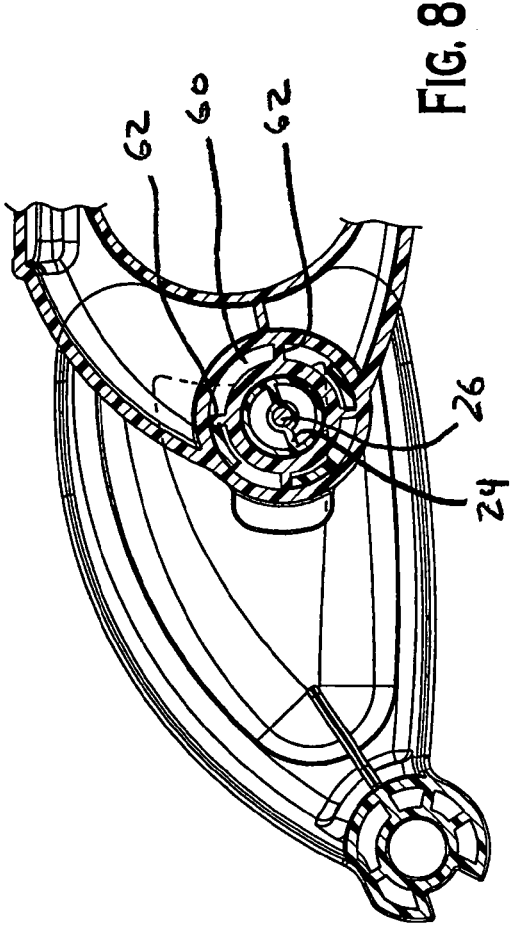

FOLDING STROLLER TRAY

BACKGROUND

Collapsible strollers, especially child strollers, of the known type typically include a front-mounted safety bar which is collapsible to enhance portability. During use of known strollers, a stroller occupant could become injured by being pinched between the movable sections of the collapsible bar.

It is desirable to provide a stroller with a collapsible tray having a reduced pinching hazard.

SUMMARY

The present invention provides a folding stroller tray with a plurality of members which have complementary nested portions that are connected by fasteners that pass the nesting portions to define axis about which the members rotate and join the members to define a desired plane of contact among the assembled members. The present invention includes a method for providing a folding stroller tray.

BRIEF DESCRIPTION OF THE DRAWING(S)

The foregoing summary as well as the following detailed description will be readily understood in conjunction with the appended drawings which illustrate preferred embodiments of the invention. In the drawings:

FIG. 7 is a cross-section of the folding stroller tray of FIG. 1 taken along line 7-7 in FIG. 6.

FIG. 8 is a cross-section of the folding stroller tray of FIG. 1 taken along line 8-8 in FIG. 7.

DETAILED DESCRIPTION OF THE PREFERRED EMBODIMENT(S)

Figure 1:
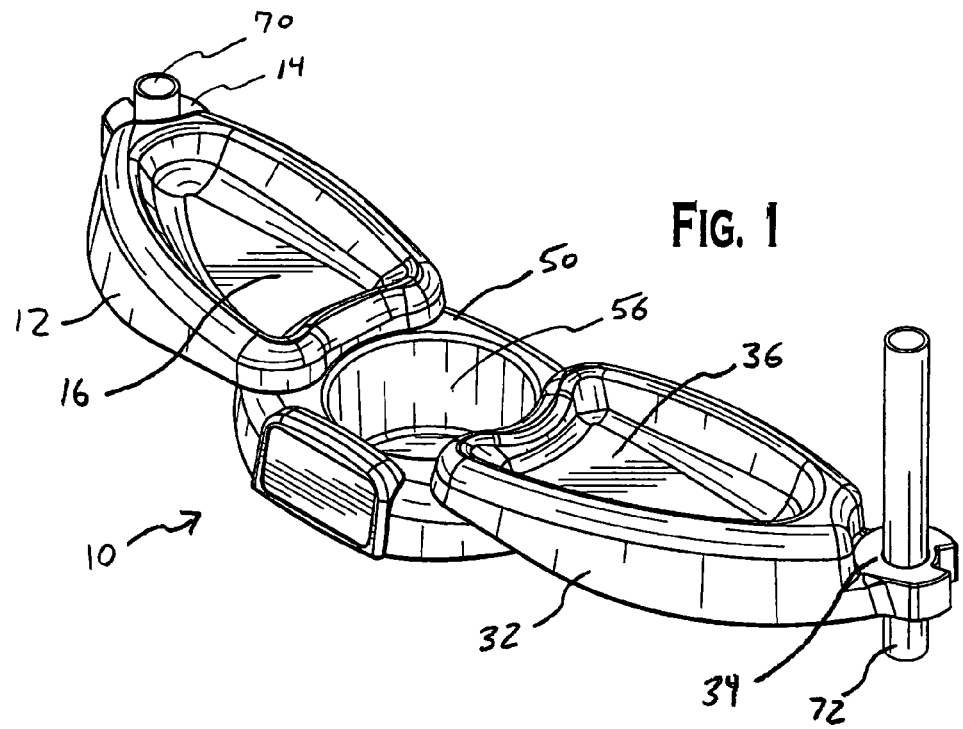
FIG. 1 is a top perspective of a folding stroller tray in accordance with a preferred embodiment of the present invention.
Figure 2:
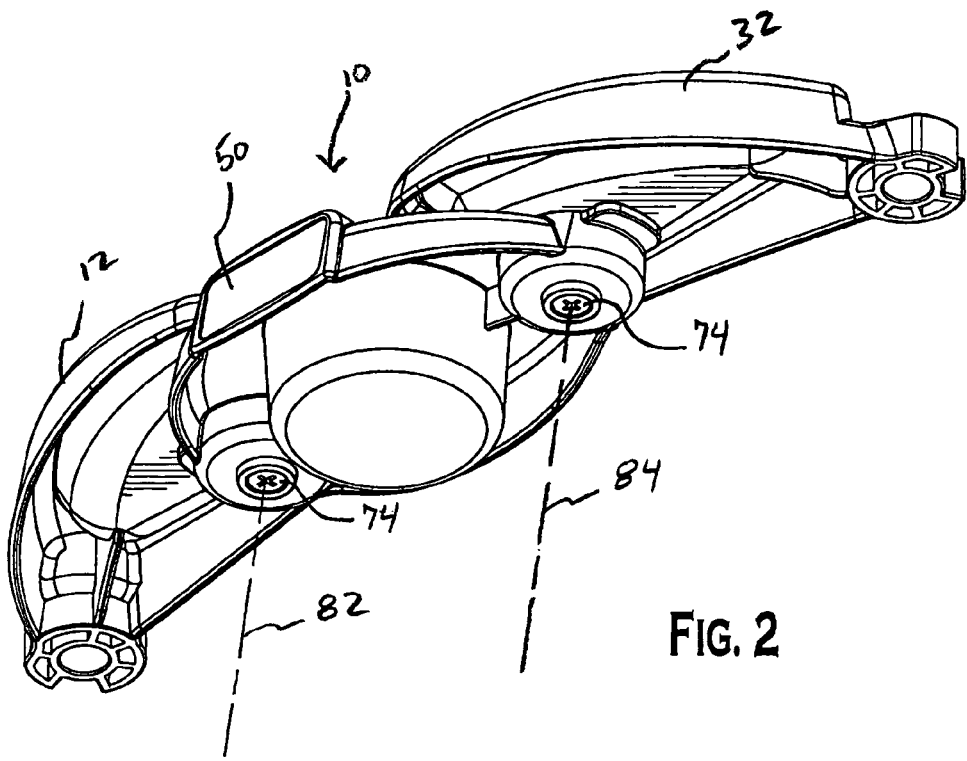
FIG. 2 is a bottom perspective of the folding stroller tray of FIG. 1.

Certain terminology is used in the following description for convenience only and is not considered limiting. Thus, words such as "front", "back", "top" and "bottom" are used to designate directions in the drawings and not by way of limitation. The preferred embodiments of the present invention are described below with reference to the drawing figures where like numerals represent like elements throughout.

Referring now to FIGS. 1-4, a folding stroller tray 10 according to a preferred embodiment of the present invention is shown with a representative connection to a stroller. The tray 10 includes a first member 12 having a first pivot connection point or connector 14 for pivotably connecting one end of the tray 10 to a first stroller structural portion illustrated at 70 in FIG. 1. The tray 10 includes a second member 32 having a second pivot connection point 34 for pivotably connecting the other end of the tray 10 to a second stroller structural portion illustrated at 72 in FIG. 1. A third member 50 is pivotably connected to the first and second members 10 and 12. As can be seen from FIG. 2, the three members 12, 32 and 50 connected together by fasteners 74 inserted axially at 82 and 84.

As shown in FIG. 1, the first and second members 12, 32 preferably include respective first and second depressions 16, 36 for storing incidentals and personal effects of the stroller occupant, and the third member 50 preferably includes a third depression 56, positioned generally between the first and second axes 82, 84.

Figure 5:
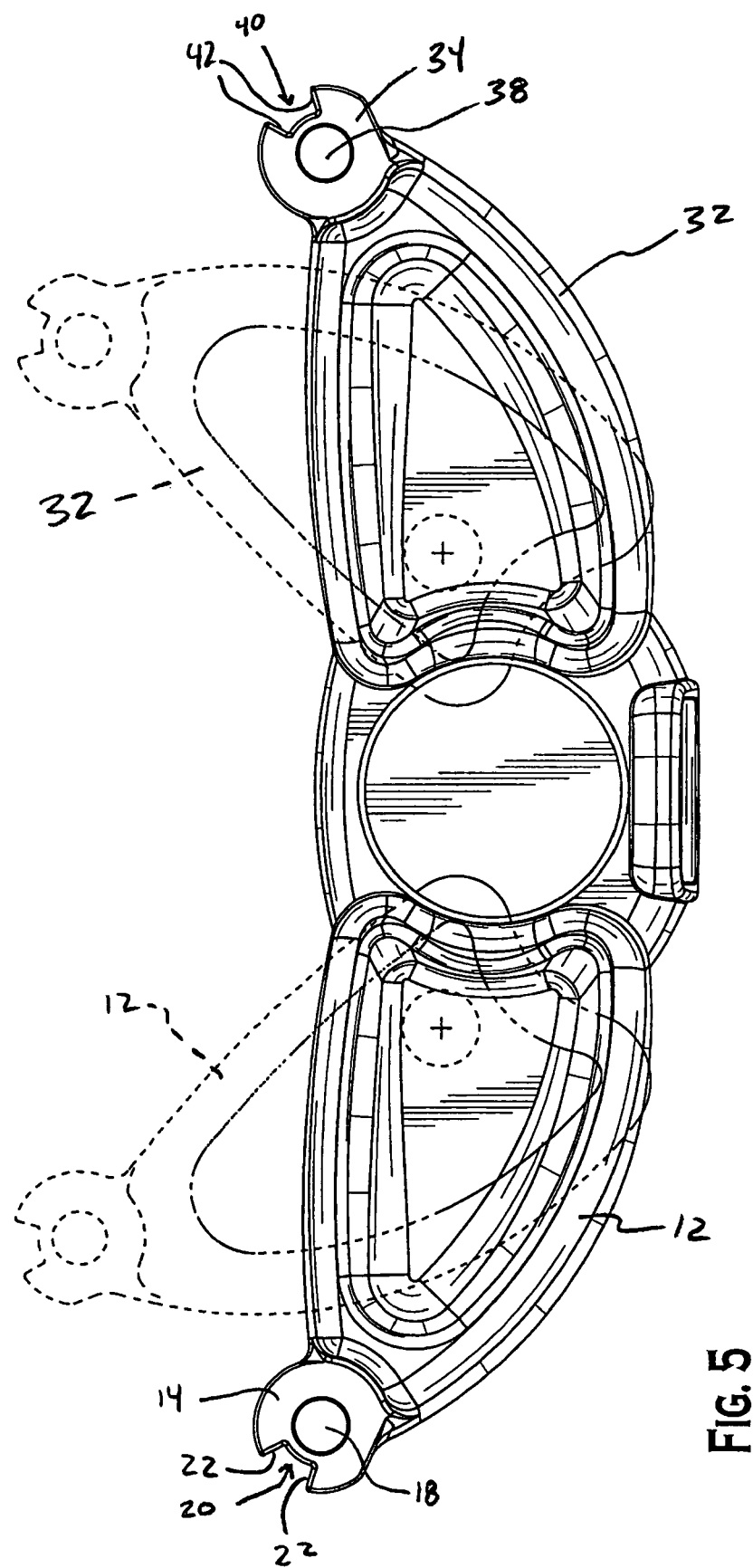
FIG. 5 is a top plan of the folding stroller tray of FIG. 1, dashed line being representative of a second position of first and second members of the folding stroller tray.
Figure 6:
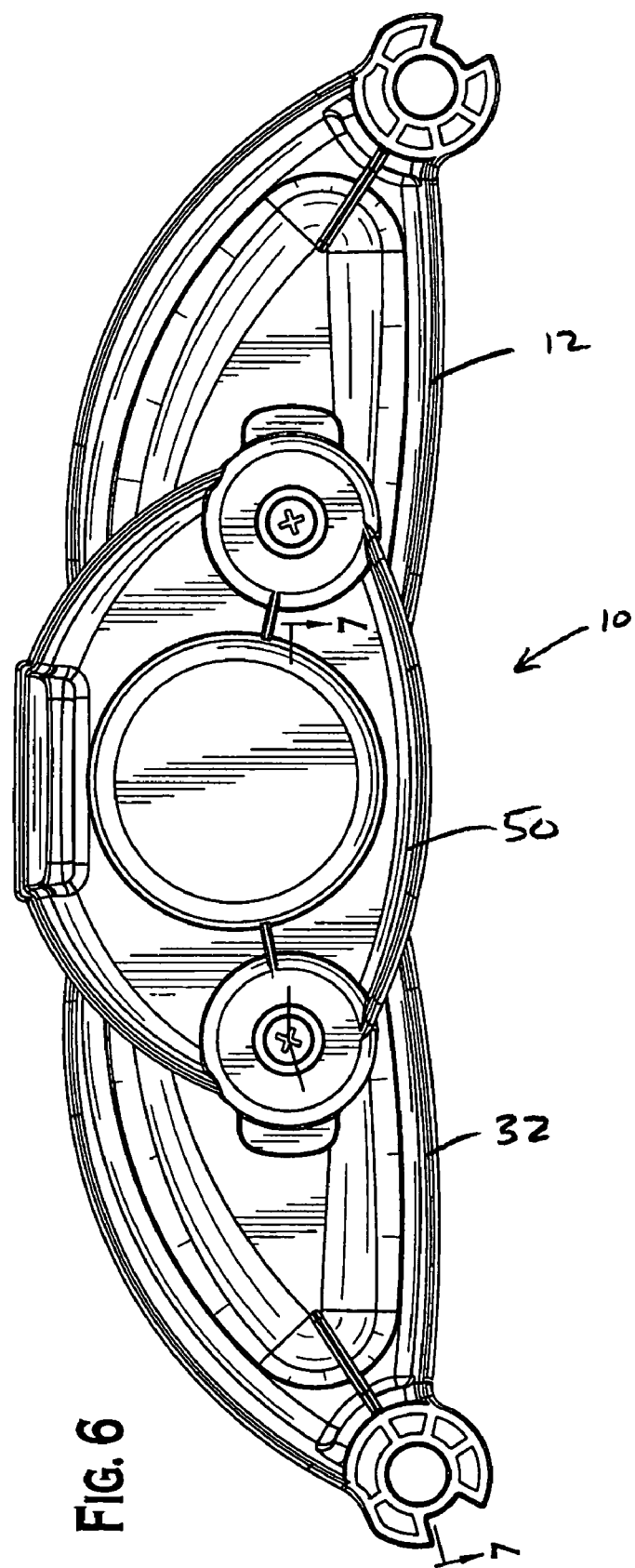
FIG. 6 is a bottom plan of the folding stroller tray of FIG. 1.

With reference to FIG. 5, the first and the second pivot connectors 14, 34 preferably include respective cylindrical apertures 18, 38 for connecting with the illustrative stroller structural portions 70, 72. Preferably, notches 20, 40 are provided in the connectors 14, 34. The notches 20, 40 include stop surfaces 22, 42 for contacting structure on the stroller to limit rotation of the first and second members 12, 32. Alternatively, the tray 10 can be provided without any rotation limiting structure.

Referring also now to FIGS. 3, 4, 7 and 8, the first and second members 12, 32 include respective first and second bearing protrusions 24, 44. The bearing protrusions 24, 44 are preferably cylindrical and tubular, as shown, and include blind concentric apertures 26, 46. The third member 50 includes complementary chambers 52 which receive the bearing protrusions 24, 44 therein. The chambers 52 are preferably blind apertures including blind surfaces 54 having concentric through holes 58. Fasteners 74, such as screws, bolts or rivets, pass through the apertures 58 into the concentric apertures 26, 46 to connect the first and second members 12, 32 to the third member 50 about the first axis 82 and the second axis 84, respectively.

Figure 3:
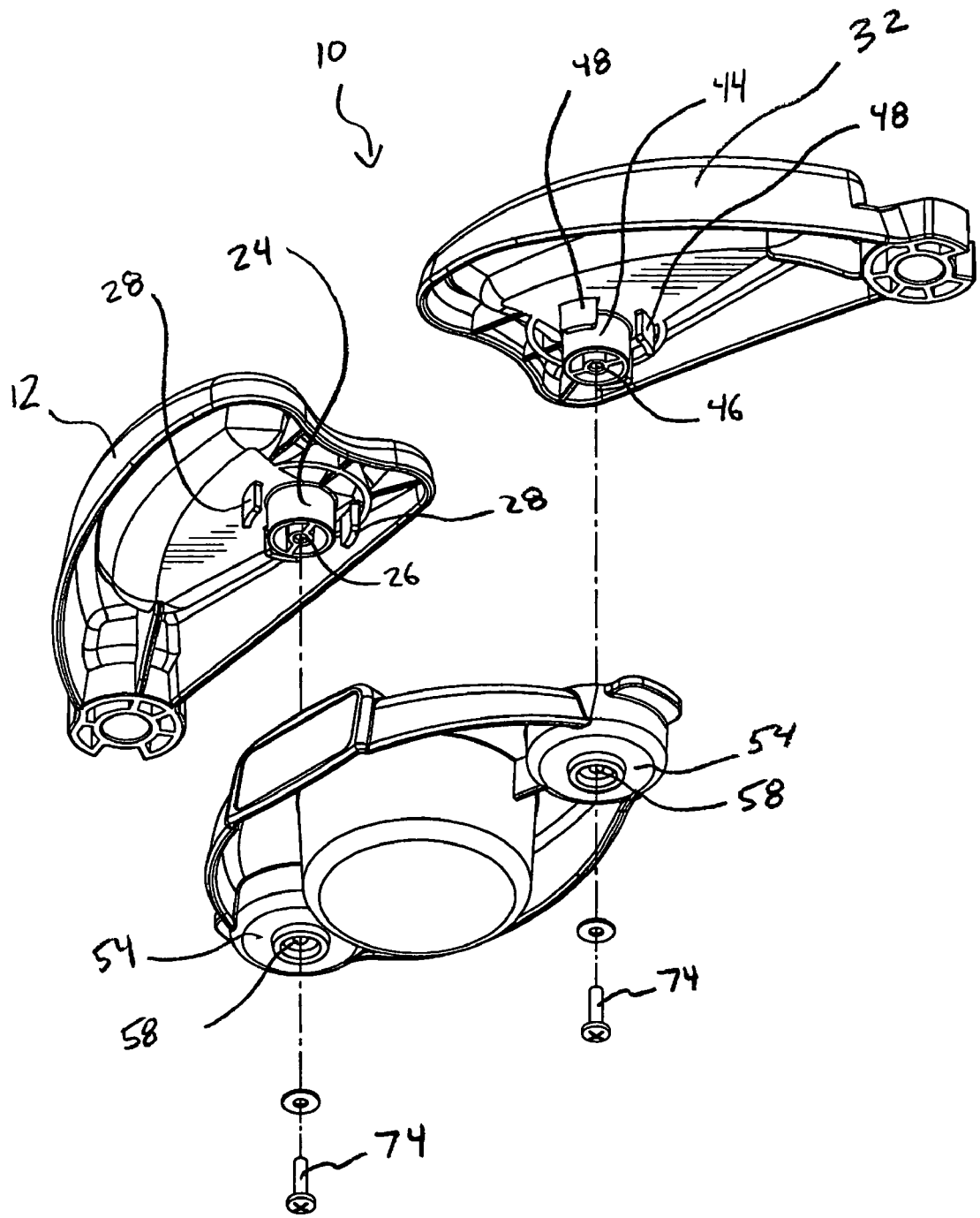
FIG. 3 is an exploded bottom perspective of the folding stroller tray of FIG. 1.
Figure 4:
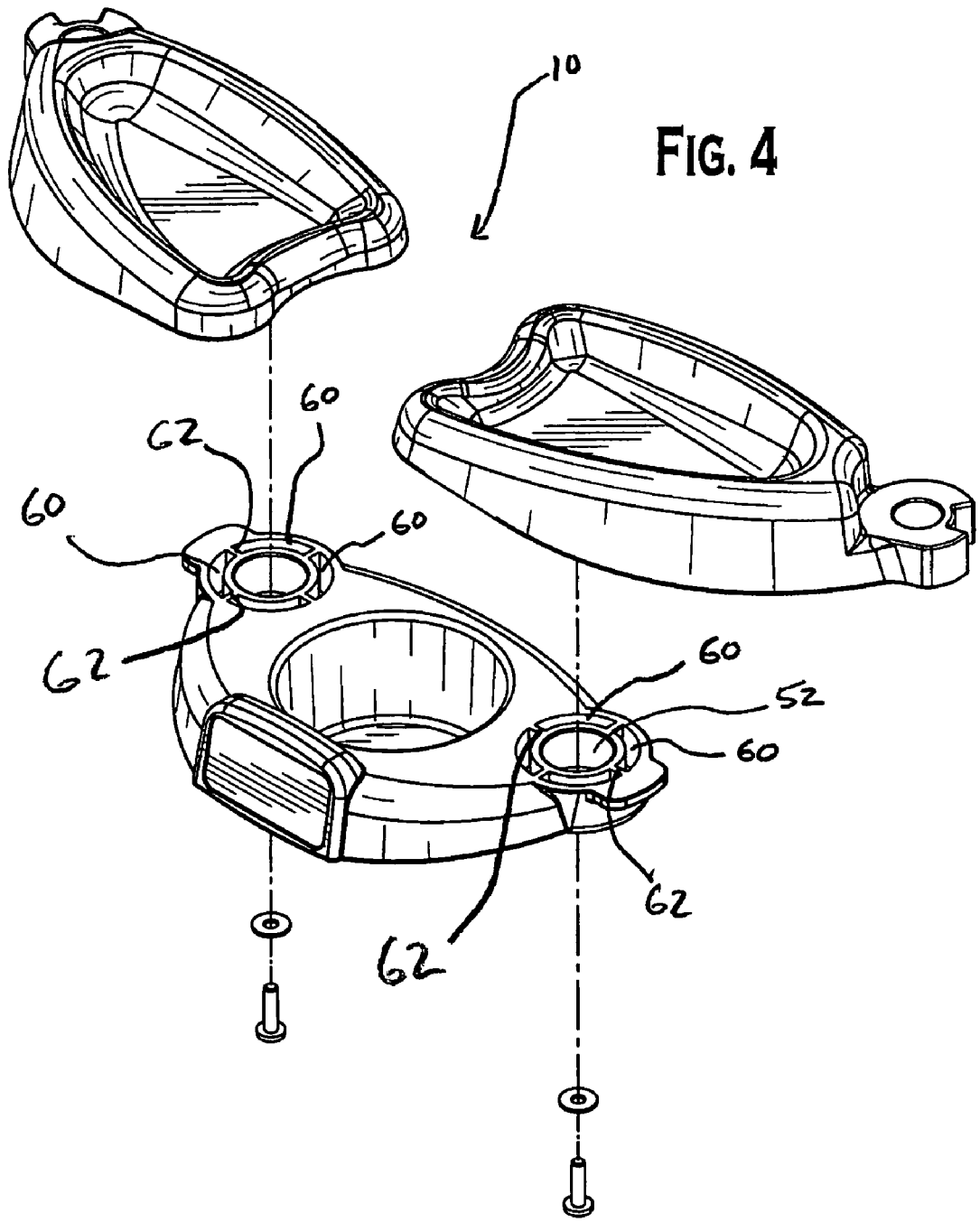
FIG. 4 is an exploded top perspective of the folding stroller tray of FIG. 1.

Preferably, the first and second members 12, 32 include projections 28, 48. The projections 28, 48 are preferably spaced radially around the bearing protrusions 24, 44, as shown in FIG. 3. The third member 50 preferably includes multiple arcuate recesses 60 in proximity to and concentrically aligned with each of the chambers 52. The recesses 60 are separated by stops 62. When the first and second members 12, 32 are assembled with the third member, each projection 28, 48 is within one of the recesses 60. The projections 28, 48, move within the arcuate recesses 60 between the stops 62 to limit the rotation of the third member 50 relative to the first and second members 12, 32. Rotation of the third member 50 about the first axis 82 relative to the first member 12, and about the second axis 84 relative to the second member 32, is prevented by contact between the projections 28, 48 and the stops 62.

As shown in FIGS. 3, 7 and 8, the bearing protrusions 24, 44 have a relatively large diameter and length, while the circumferentially arranged projections 28, 48 are distanced away from their respective axes 82, 84. This configuration serves to provide significant bearing surfaces corresponding to the first and second axes 82, 84 and prevents relative movement of the three members 12, 32 and 50 out of a desired plane.

As shown in FIG. 7, the relatively close fit between the members still allows rotation of the members about the axis 82 and 84, but does not permit off axis movement of the nested portion 24. This assemble allow the members to define and maintain the plane "P" between the contacting surfaces of members 12 and 50. This resistance to off axis movement prevents distortion of the tray and virtually eliminates the potential for a pinching zone to be formed by relative movement of members out of the plane "P." The relative tolerances of the nested portions will depend upon the rigidity of the material selected. However, it will be appreciated that the closest fit that still permits rotation of the nested construction about the axis is most desirable for preventing a gap from forming between the first or second members 12 and 32 and the third member 50.

As shown in FIG. 5, even while limiting movement of the first, second and third members 12, 32, 50 from a desired plane, the stroller tray 10 is adjustable from a first position, shown in solid lines, to a second position, shown in dashed lines, without disturbing the nested construction.

The first, second and third members 12, 32, 50 are preferably formed of a suitable polymeric material by molding or vacuum forming.

While the preferred embodiments of the invention have been described in detail above, the invention is not limited to the specific embodiments described above, which should be considered as merely exemplary. Further modifications and extensions of the present invention may be developed, and all such modifications are deemed to be within the scope of the present invention as defined by the appended claims.

What is claimed is:

1. A folding stroller tray comprising:
    a first member having first and second end portions with a first nesting member formed at a selected end;
    a second member having first and second end portions with a second nesting member formed at a selected end;
    a third member having first and second end portions with complementary nesting members formed at the first and second end portions, each of the complementary nesting members complementing a selected one of the first and second nesting members; and
    at least two fasteners rotatably connecting the nesting members of the first, second and third members together, each fastener defining an axis of rotation for the connected nesting members and maintaining a plane between a contact surface of each connected nesting member;
    at least one projection included with at least one of the first nesting member, the second nesting member, and the complementary nesting members;
    at least another one of the first nesting member, the second nesting member, and the complementary nesting member defining at least one arcuate recess, the at least one arcuate recess being generally concentrically aligned with a rotational axis of at least one of the nesting members, the at least one projection being contained by the arcuate recess; and
    at least one stop positioned in the arcuate recess for preventing motion of the at least one projection;
    whereby rotation of the third member around at least one of the first and second members is limited by contact between the projection and the stop.

2. The folding stroller tray according to claim 1, wherein the first member includes a first connector for connection to a first structural portion of a stroller and the second member includes a second connector for connection to a second structural portion of the stroller.

3. The folding stroller tray of claim 1, wherein each connected nesting member includes a bearing protrusion and a chamber, and the bearing protrusion is seated in the chamber to form a rotatable connection about the axis of rotation.

4. The folding stroller tray of claim 3, wherein the bearing protrusion is dimensioned to fit within the chamber and prevent off axis movement of the connected nesting members.

5. The folding stroller tray of claim 3, wherein the at least one projection is spaced apart from the axis of rotation.

6. The folding stroller tray of claim 3, wherein the at least two fasteners extend into a respective bearing protrusion and are axially aligned with the respective bearing protrusion.

7. The folding stroller tray according to claim 1, wherein at least one of the first member, the second member and the third member includes a storage area.

8. The folding stroller tray according to claim 2, wherein the first and the second connectors define an aperture for receiving a respective one of the first and the second stroller structural portions.

9. The folding stroller tray of claim 1, wherein the first and third members are connected together by at least one of the at least two fasteners at a first pivot formed by the first nesting member and one of the complementary nesting members, and wherein the second and third members are connected together by at least another one of the at least two fasteners at a second pivot formed by the second nesting member and another one of the complementary nesting members.

10. The folding stroller tray of claim 1, wherein at least one of the first, second and third members are formed of a polymeric material.

11. The folding stroller tray of claim 1, wherein at least one of the first, second and third members are formed of a metallic material.

12. A folding stroller tray comprising:
    a first member having first and second end portions with a first nesting member formed at a selected end;
    a second member having first and second end portions with a second nesting member formed at a selected end;
    a third member having first and second end portions with complementary nesting members formed at the first and second end portions, each of the complementary nesting members complementing a selected one of the first and second nesting members; and
    at least two fasteners that rotatably connect the nesting members of the first, second and third members together and define an axis of rotation and maintain a plane between a contact surface of each connected nesting member;
    wherein each of the first nesting member, the second nesting member, and the complementary nesting members include at least one of a bearing protrusion and complementary chamber, and at least one of projections and complementary recesses spaced from the at least one of the bearing protrusion and the complementary chamber, wherein the bearing protrusion is contained in the complementary chamber and the projections are contained in the complementary recesses to pivotably connect the first, second, and third members together.

13. A method of providing a folding stroller tray comprising:
    providing a first member having first and second end portions with a first nesting member formed at a selected end;
    providing a second member having first and second end portions with a second nesting member formed at a selected end;
    providing a third member having first and second end portions with complementary nesting members formed at the first and second end portions, each of the complementary nesting members complementing a selected one of the first and second nesting members;
    providing the first and second nesting members with a bearing protrusion and providing each of the complementary nesting members with a complementary chamber having a blind cylindrical aperture;
    providing a through hole on a blind surface of each blind aperture concentric with the blind aperture; and
    pivotably connecting the first member to the third member by inserting the bearing protrusion of the first nesting member into the complementary chamber of one of the complementary nesting members and inserting a screw through the through hole into the bearing protrusion; and pivotably connecting the second member to the third member by inserting the bearing protrusion of the second nesting member into the complementary chamber of the other complementary nesting member and inserting a screw through the through hole into the bearing protrusion.

14. The method of claim 13, further comprising providing at least one of the first member, the second member and the third member with at least one depression.

15. The method of claim 13, further comprising providing each of the first nesting member, the second nesting member, and the complementary nesting members with at least one of a bearing protrusion and complementary chamber, and at least one of projections and complementary recesses spaced from the at least one of the bearing protrusion and the complementary chamber, wherein connecting each of the first and second nesting members to one of the complementary nesting members includes inserting the projections into the recesses, and inserting the bearing protrusion into the complementary chamber.

* * * * *